Dec. 22, 1942.          R. L. KNOWLES ET AL          2,306,021
                  PROCESS FOR TREATING MINERAL MATERIALS
                          Filed June 6, 1940
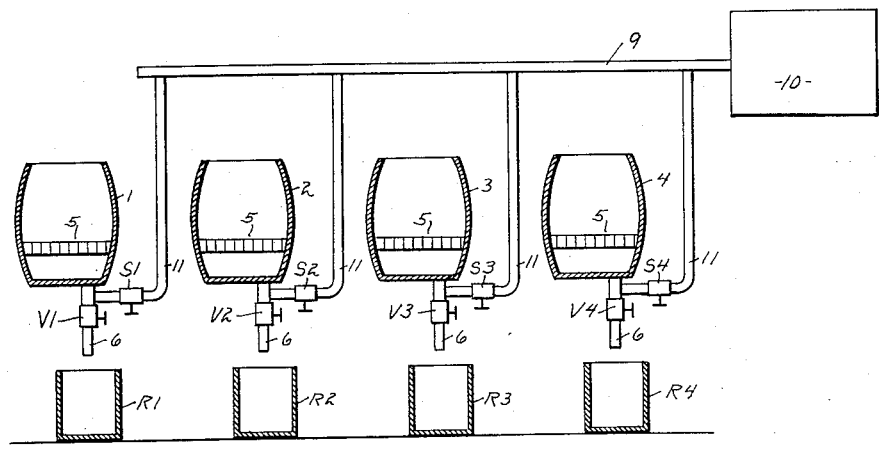
                                        INVENTORS.
                                     Raymond L. Knowles
                                     Henry S. Colton
                                BY   Robert W. Frischmuth
                                     Harry P. Canfield, Attorney Patented Dec. 22, 1942

UNITED STATES PATENT OFFICE 2,306,021

PROCESS FOR TREATING MINERAL MATERIALS

Raymond L. Knowles, Bronxville, N. Y., and Robert W. Frischmuth and Henry S. Colton, Cleveland, Ohio, assignors to The Thompson Silica Company, Thompson, Ohio, a corporation of Ohio Application June 6, 1940, Serial No. 339,118

11 Claims. (Cl. 23—182)

This invention relates to processes for treating mineral materials as found in the natural state.

The invention is particularly applicable to the removal of foreign matter from the pores of porous silicious material as found in the natural state in the earth, in the form of granules and pebbles, and to the reconditioning of the outer surfaces and the walls of the pores thereof, and will be described as applied to that use, although as will become apparent hereinafter it may have other uses.

Silicon is found in deposit beds of discrete sand and pebbles in the form of silica, (silicon dioxide); and such natural silica often is porous, the pores containing foreign material, for example iron, in the form of iron oxide: $FeO$, $Fe_2O_3$, $Fe(OH)_2$, and $Fe_2O_3 \cdot XH_2O$, entrapped in the pores of the silica sand and pebbles, and other foreign substances mixed with the iron oxide as a vehicle. While the silica itself may be substantially pure silicon dioxide, the presence of the iron oxide and accompanying foreign material renders the natural substance unfit for many commercial and industrial uses, and the condition of the surface of the silica resists the reactions and processes by which the silica is associated with other materials in industrial uses.

The primary object of this invention is to provide an improved process for purifying discrete particles of silica by removing the iron oxide and other foreign material from the pores thereof, and for reconditioning the surfaces of the particles and the walls of the pores thereof.

A further object is to provide as an article of commerce discrete porous silicon dioxide particles the pores of which are clean and uncontaminated by foreign material, and the surfaces of which pores as well as the outer surfaces of the particles are in improved condition for further processing.

Our invention is fully disclosed in the following description taken in connection with the accompanying drawing which illustrates diagrammatically an apparatus for performing some of the steps of the process of our invention.

In the preferred practice of the invention the natural porous silica is collected from the deposit bed of sand and pebbles, and is subjected to the action of a ball mill, or like well known apparatus, to loosen any dirt, clay or other extraneous matter which may be adhering thereto. The sand and pebbles are then washed in water to carry off such loosened foreign material; and the sand is then separated from the pebbles by means of a screening apparatus having a screen of approximately 80 mesh to the inch. The separated pebbles may then be crushed to reduce them also to sand of like size, by any well known crushing and screening apparatus.

The sand is then subjected to the action of an acid solution, and this step of the process is preferably performed by an apparatus of the continuous counter-flow type in which the acid solution and the sand move or flow in opposite directions, and in such manner that the fresh acid solution encounters sand which has already been partly purified of its iron oxide, and the acid solution which has been contaminated by the iron oxide encounters the fresh unpurified sand.

When relatively small quantities of sand are being treated by the acid solution, we may employ a batch process apparatus, such as illustrated in one form, and diagrammatically, in the accompanying drawing to which reference will presently be made.

In order to reduce the surface tension of the acid solution to be referred to, we preferably, but not necessarily, employ a wetting agent mixed with the sand and the acid solution. Any well known wetting agent may be utilized for this purpose but we prefer to use commercial "Tergital."

The acid solution which we may employ consists of approximately 10% of sulphuric acid ($H_2SO_4$), and 10% sodium chloride (NaCl). The sand is immersed in this acid solution, and the reaction which occurs converts the iron oxides as above mentioned, into iron chlorides $FeCl_3$ and $FeCl_2$, which are water soluble and go out in solution.

In this reaction, the sulphuric acid and sodium chloride produce hydrochloric acid which reacts on the iron oxide to produce soluble iron chloride.

Preferably, however, we add to the above mentioned acid solution hydrofluoric acid, (HF), for example about 1%, because we have found by experimentation that the presence of hydrofluoric acid accelerates the conversion of the iron oxides into chlorides. This we believe to be due to the penetration of the hydrofluoric acid into the pores of the silica and to the softening of the silica of the pore walls thereby, and the consequent mechanical loosening of the iron oxides in the pores, so that they may be more readily acted upon by the acid solution. This action of the hydrofluoric acid furthermore causes the solution to substantially clean out the pores during the removal of the iron oxides.

We have found also that the chemical reaction referred to, particularly when hydrofluoric acid is utilized, effects softening and cleansing of the pore walls and the outer surfaces of the sand particles and thereby reduces these surfaces to a condition which facilitates the further industrial processing of the granules, as referred to hereinafter.

We have found furthermore that the said reaction may be further accelerated by heat, and we therefore prefer to apply heat, and have found that this may be conveniently done by passing steam through the sand while wet with the acid solution.

After the above described chemical reaction has taken place, the sand is washed with water to dilute and carry off the remaining acid solution and any dissolved iron chloride adhering to the sand, and the surface material on the surfaces of the particles and on the pore walls which has been loosened as described.

The remaining sand is now dried, and being substantially free from iron oxides or chlorides, and being substantially pure porous silicon dioxide and each particle having improved surfaces as stated, is available for commercial and industrial purposes.

Referring now to the drawing, in which as stated, we have illustrated diagrammatically an apparatus by which the process of our invention may be practiced as a batch process, we have shown a plurality such for example, as four, acid proof containers, 1, 2, 3, and 4, which may conveniently be wooden barrels, having perforated false bottoms 5—5 disposed transversely intermediately of the ends of the barrels, which false bottoms may conveniently be coarse grating covered by liquid pervious fabric.

Discharge pipes 6 are provided below the false bottoms, controlled by valves V1 to V4. Acid solution receptacles R1 to R4 stand under the discharge pipes 6. A steam line 9, from a source of steam indicated diagrammatically at 10 is connected by pipes 11 with the discharge pipes 6 at points between the barrels and the discharge valves V1 to V4, and steam valves S1 to S4 are provided to control the pipes 11. At the start of the process, a like quantity of deposit silica sand, prepared as described above, is placed in each of the barrels; and acid solution as described is poured into the barrel 1, covering the sand, the valves at this time all being closed. After a suitable period of reaction time has elapsed, the acid solution is drained out into the receptacle R1, through the valve V1, and fresh acid solution is poured into the barrel 1. The partly contaminated acid solution drained from the barrel 1 is poured into the barrel 2, covering the sand therein; then, after a time period, the still further contaminated acid solution in the barrel 2 is poured into the barrel 3, and that in the barrel 1 into the barrel 2, and fresh acid solution is poured into the barrel 1, and finally the still further contaminated acid solution in the barrel 3 is drained off and poured into the barrel 4, that in the barrel 2 transferred to the barrel 3, and that in the barrel 1 to the barrel 2.

The barrel 1 now has fresh acid solution put therein, and the other barrels, 2 to 4, contain progressively more and more contaminated acid solution, and the barrel 4 contains sand that has not been purified at all, and the other barrels progressively from 3 to 1, contain sand that is progressively more and more purified.

The apparatus now is in the state for continuous batch production. When the acid solution within the barrels has acted for a sufficient time on the sand therein, the acid solution in the barrel 4 is drained off and discarded as waste. The acid solution in barrel 1 is drained off, and the sand therein is removed and washed as finished sand. Fresh sand is then put into barrel 1, and the acid solution drained from barrels 2 and 1 is transferred respectively to barrels 4 and 3 and fresh solution is put in barrel 2. Barrel 1 now therefore becomes, in effect, barrel 4, or stage 4, of the series, and the barrel 2 becomes barrel 1 or stage 1 of the series, and barrels 3 and 4 become barrels or stages 2 and 3 of the series.

This operation of transferring the solution from one barrel to the other in seriatim, discarding used acid from the last barrel or stage of the series, and taking finished sand from the first of the series, is continued, each barrel taking up successively a different stage or position in the series as the process proceeds. As will readily be seen without further description, the fresh sand is subjected to acid solution which has previously acted upon sand in the three preceding barrels or stages, and the fresh acid solution is introduced into the barrel containing sand which has already been largely purified by having been acted upon by the acid solution in the other three barrels or stages of the series; and that acid solution in the two intermediate barrels or stages of the series and of two degrees of contamination, acts upon sand of corresponding degrees of freshness; so that the batch process here described is equivalent to the so-called counter-flow continuous process referred to hereinbefore. As will be obvious any desired number of barrels in the series may be utilized.

As stated above we prefer to accelerate the chemical action by the heat of steam, and to this end, in the above described batch process, steam is admitted to each barrel at the lower end thereof under the false bottom, during each of the above described periods of time that the solution is allowed to act upon the sand, and this is accomplished, for example in barrel 1, by closing the valve V1 and opening the valve S1 for a suitable time, causing the steam to flow into the space under the false bottom and to be distributed uniformly therein, and to flow upwardly through the false bottom and through the entire cross-section of the mass of the sand, to heat the solution and the sand above the false bottom.

As mentioned above we have found that, by the practice of our invention, not only are the pores of the silica sand particles rendered free of all foreign matter, including any which may be present along with the iron oxides as a vehicle, but also that the walls of the pores of the resulting silica sand, as well as the exterior surfaces of the particles are cleaned and purified and conditioned. These conditioned surfaces perform various functions when the sand is processed in use in the various arts.

Such porous sand granules may be used as a filter superior to solid granules.

Again, the walls of the cleaned-out pores, by increasing the surface area of the granules, cause the granules to absorb heat and attain a melting temperature more readily when heated in a melting or fusing process. Again when the granules are subjected to pressure with other media, the pores function as receptacles for the media and the conditioned surfaces of the pore walls as well as these on the outside of the particles provide for intimate interconnection of the surfaces of adjacent granules, which in some uses is highly desirable, for example when sodium and other alkali compounds are mixed with the granules and fused together, the effect of the porosity and the improved condition of the said surfaces being to produce a more perfect and more easily melted product.

As a more concrete example, in the manufacture of glass, silica sand granules are mixed with soda ash, lime and other alkalies and fused together by heat. The time required to melt the sand, and the necessary degree of temperature, are important from the viewpoint of economy. In melting the sand in such a process, it must be fused with the alkali, and to accomplish this good surface contact must be made between the pure silica of the sand and the alkali. We have found that with silica granules having surfaces of the improved condition resulting from our above described process, this surface contact is so improved that the melting results in a shorter time and at lower temperature.

Again, in the making of plastics using silica as a filler, silica sand, prepared by our described process, because of the fact that both its outer surfaces and the surface of its pore walls are reduced to reconditioned clean silica, becomes bound more securely into the plastic, than is otherwise possible resulting in a stronger finer plastic product.

Again in the coating of silica sand particles for roofing and analagous purposes, coating processes as heretofore practiced require that the temperature of the particles be elevated to temperatures of the order of 1500 to 2000 degrees F., whereas with particles the surfaces of which have been reconditioned by the above described process a much lower temperature is sufficient.

While we prefer to use, in the acid solution, sulphuric acid and sodium chloride, it will be understood that our invention may be practiced with an acid solution made from compounds taken from the chemical groups to which these specified components of the acid solution belong. For example we may use potassium chloride or calcium chloride instead of sodium chloride. And likewise our invention is not limited to the exact percentages mentioned above, of the components of the acid solution.

And in other respects our invention is not limited to the exact details of the apparatus, or the exact steps of the process above described, but is inclusive of all modifications thereof which come within the scope of the appended claims.

We claim:

1. The process of removing iron oxide from natural silicon dioxide sand, which includes converting the iron oxide into a soluble iron salt by the action of an acid solution containing sulphuric acid and sodium chloride.

2. The process of removing iron oxide from natural silicon dioxide sand, which includes converting the iron oxide into a soluble iron salt by the action of an acid solution containing sulphuric acid, sodium chloride and hydrofluoric acid.

3. The process of removing iron oxide from natural silicon dioxide sand, which includes converting the iron oxide into a soluble iron salt by the action of an acid solution containing approximately ten percent of sulphuric acid, and ten percent of sodium chloride; accelerating the reaction by the application of heat to the sand and acid solution; separating the sand and solution; and washing the sand in water.

4. The process of removing iron oxide from natural silicon dioxide sand, which includes converting the iron oxide into a soluble iron salt by the action of an acid solution containing approximately ten percent of sulphuric acid, ten percent of sodium chloride, and one percent of hydrofluoric acid; accelerating the reaction by the application of heat to the sand and acid, separating the sand and solution, and washing the sand in water.

5. The process of removing iron oxide from natural silicon dioxide sand, which includes converting the iron oxide into a soluble iron salt by the action of an acid solution containing approximately ten percent of sulphuric acid and ten percent of sodium chloride and containing a wetting agent; accelerating the reaction by the application of heat to the sand and acid solution; separating the sand and solution; and washing out the sand in water.

6. The process of removing iron oxide from natural silicon dioxide sand, which includes converting the iron oxide into a soluble iron salt by the action of an acid solution containing approximately ten percent of sulphuric acid, ten percent of sodium chloride, and one percent of hydrofluoric acid and containing a wetting agent; accelerating the reaction by the heat of steam passed through the sand while being acted upon by the acid solution; separating the sand and solution; and washing the sand in water.

7. The process of cleaning out the pores of porous silicon dioxide granules containing iron oxide and other foreign matter occluded in the oxide as a vehicle, which includes subjecting the granules in the presence of heat to the action of an acid solution containing hydrofluoric acid to soften the walls of the pores to loosen the iron oxide therein, and containing sulphuric acid and sodium chloride to convert the iron oxide into water soluble iron salt, separating the granules and solution; and washing the granules in water to dilute remaining iron salt and wash it and the occluded foreign matter out of the pores.

8. The process of reconditioning the outer surfaces and pore wall surfaces of porous silica sand granules, which includes subjecting the granules to the action of a solution containing hydrofluoric acid, and an acid which reacts upon iron oxide which may be present in the pores to render it water soluble.

9. The process of reconditioning the surfaces of porous silica sand granules, which includes: subjecting the granules to the action of an acid solution containing hydrofluoric acid to soften the outer surfaces and the surfaces of the pore walls; and containing sulphuric acid and sodium chloride to convert iron oxide that may be present in the pores into soluble iron salt; separating the granules and solution; and washing the granules in water to dilute and remove remaining salt and to remove surface material loosened by the softening action of the hydrofluoric acid.

10. The process of removing iron oxide from natural silicon dioxide sand which includes: converting the iron oxide into a soluble iron salt by the action of an acid solution containing hydrochloric acid formed by sulphuric acid and a chloride in contact with the sand.

11. The process of removing iron oxide from natural silicon dioxide sand which includes: converting the iron oxide into a soluble iron salt by the action of an acid solution containing hydrofluoric acid and containing hydrochloric acid formed by sulphuric acid and a chloride in contact with the sand.

RAYMOND L. KNOWLES.
ROBERT W. FRISCHMUTH.
HENRY S. COLTON.